Patented Dec. 25, 1923.

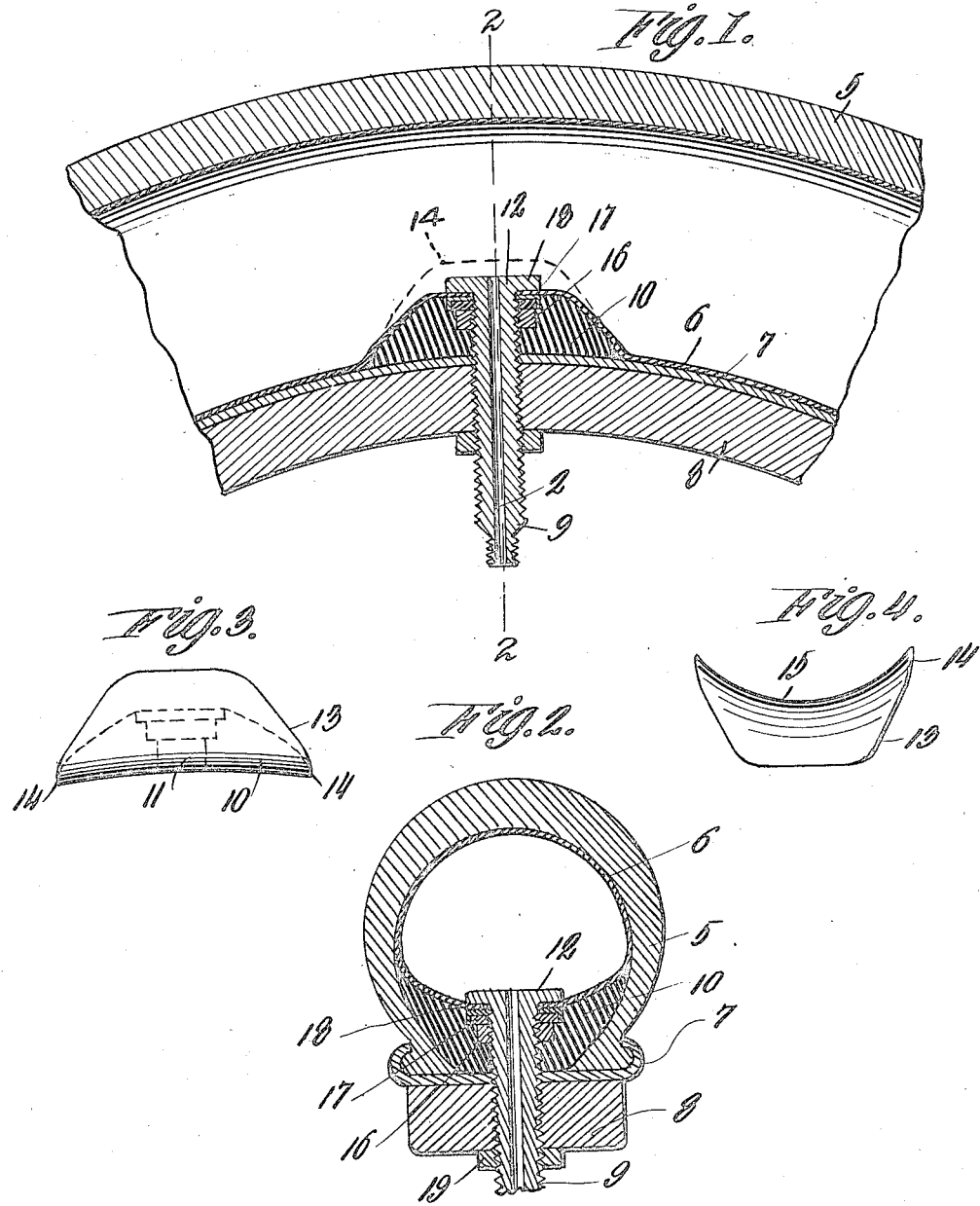

1,478,983

UNITED STATES PATENT OFFICE.

HARLOW H. HATHAWAY, OF PHOENIX, ARIZONA.

TIRE ATTACHMENT.

Application filed November 15, 1921. Serial No. 515,365.

*To all whom it may concern:*

Be it known that I, HARLOW H. HATHAWAY, a citizen of the United States, residing at Phoenix, in the county of Maricopa and State of Arizona, have invented certain new and useful Improvements in Tire Attachments, of which the following is a specification.

This invention relates to a tire attachment and more particularly to a novel and improved bumper block, adapted for cooperation with a valve stem and the inner tube of a tire or casing, whereby the car wheel will be caused to bump and thus signal the driver that the said tire is deflated.

The primary object of the invention resides in the construction of a bumper block so arranged in relation with the inner tube and casing of the tire as to prevent the cutting and otherwise destruction of the inner tube by the tire valve and casing by the rim of the wheel when the tire is deflated.

Another and very important object of the invention resides in a bumper block of the class above set forth which will prevent the slipping of the casing on the inner tube when the tire is flat and thus preventing tearing or destruction of the inner tube when traveling on a flat tire, as is a common occurrence.

A still further and important object of the invention resides in the construction of a bumper block adapted to be constructed of various kinds of material, such as wood, metal, and other compositions of matter, but preferably of rubber or equivalent material, whereby the edges of the block may be distended when the same is once positioned and prevent the tearing of the inner tube at the point of contact therewith.

A continued object of the invention resides in the provision of a bumper block adapted for connection with various types of threaded or non-threaded valve stems and of universal application to any type or design of pneumatic tire, and one in which the parts are extremely simple in construction, highly efficient in operation, practical, durable and otherwise capable of being manufactured at an extremely low cost, whereby its commercial possibilities are enhanced.

The invention will be best understood from a consideration of the following detailed description taken in connection with the accompanying drawing forming a part of this specification, with the understanding, however, that the invention is not confined to any strict conformity with the showing in the drawing, but may be changed and modified so long as such changes and modifications mark no material departure from the salient features of the invention as expressed in the subject matter being claimed.

I attain these objects and others in the accompanying drawing wherein:

Figure 1 is a sectional view showing the invention as applied to a conventional type of tire and inner tube.

Figure 2 is a section taken on the line 2—2 of Figure 1.

Figure 3 is a side view of the bumper block; and

Figure 4 is an end view thereof.

Referring now to the drawings wherein like reference characters designate corresponding parts throughout the several views, I have shown my invention as applied to the conventional type of pneumatic tire 5, having an inner tube 6, which is held by the flanged rim 7 of a wheel 8, the bumper block being preferably mounted on the threaded valve stem 9, as clearly shown by Figures 1 and 2 of the drawing.

The bumper block above referred to and designated in its entirety by numeral 10 is preferably made of resilient material, such as rubber, although it will be readily apparent that the same is not necessarily restricted thereto, since the block may also be constructed of wood fibre or any other composition of matter suitably covered so that when it is mounted on the valve stem 9 it will not fracture or cut the inner tube. Referring to Figure 3, it will be observed that the bumper block is provided with a central recess 11 therein to receive the head 12 of a valve stem, the upwardly tapered side 13 of said block terminating in thin, somewhat beveled edges 14 of the curved top 15, it being observed that said beveled edges are disposed in a plane considerably above the head 12, so that when the inner tube is deflated the edges of the bumper block will not cut or fracture the inner tube 6. A nut and washer 16, 17, below the cap 18, insures positive positioning of the block on the stem, it being observed that a second nut 19 bearing against the wheel 8 is also provided, whereby as the same is tightened and depresses the bumper block in its proper position, the edges 14 will be somewhat distended to make proper contacting engagement with the inner tube 6, as clearly shown by Figure 2 of the drawing.

By reason of this construction it will be readily apparent that as the inner tube is deflated the edges 14 will produce a bumping action, as the tire revolves with the wheel, and yet the head 12 of the stem will not bear against the inner tube or otherwise cut the same before the bumping action takes place. It will also be readily apparent that by positioning the bumper block in the manner shown that the inner tube will be prevented from slipping or otherwise moving out of position in the casing and thus rip at the valve stem. Moreover the bumper block performs the additional function of preventing the water from entering the casing and rotting the inner tube as well as the lining of said casing.

While I have described and shown the invention as best applicable for use when a resilient composition of matter, such as rubber is used, it will of course, be obvious that the same is not necessarily restricted thereto, but has very many advantages when rubber is used, since the resiliency and distortion thereof when the stem is depressed on the curved or concaved top at 15, causes the edges at 14 to properly engage the inner tube and of course prevents any possibility of fracture of the inner tube when the block is so applied.

In the accompanying drawings I have illustrated my invention embodied in one form by way of example, and which in practice has been found to be highly satisfactory in obtaining the desired results. It will be obvious, however, that other embodiments may be adapted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having thus described and illustrated my invention, what I claim as new and desire to secure through Letters Patent is:

The combination of a tire casing and inner tube having a valve stem, of a bumper block formed with a concaved top, mounted on the valve stem between the casing and the inner tube, and through which said valve stem extends the top edges of said block being beveled for contacting engagement with the tube and disposed in a plane above the head of the valve stem, whereby a bumping signal is produced when the inner tube is deflated.

In testimony whereof I affix my signature in presence of two witnesses.

HARLOW H. HATHAWAY.

Witnesses:
J. B. SHEASLEY,
ROY M. HACKETT.